(12) United States Patent
Park

(10) Patent No.: US 11,598,930 B2
(45) Date of Patent: Mar. 7, 2023

(54) LIQUID LENS, CAMERA MODULE AND OPTICAL DEVICE INCLUDING THE SAME

(71) Applicant: LG INNOTEK CO., LTD., Seoul (KR)

(72) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 498 days.

(21) Appl. No.: 16/485,392

(22) PCT Filed: Feb. 14, 2018

(86) PCT No.: PCT/KR2018/001928
§ 371 (c)(1),
(2) Date: Aug. 12, 2019

(87) PCT Pub. No.: WO2018/151524
PCT Pub. Date: Aug. 23, 2018

(65) Prior Publication Data
US 2019/0377152 A1  Dec. 12, 2019

(30) Foreign Application Priority Data

Feb. 14, 2017 (KR) .................. 10-2017-0019835

(51) Int. Cl.
*G02B 7/02* (2021.01)
*G02B 3/14* (2006.01)
*G02F 1/29* (2006.01)

(52) U.S. Cl.
CPC .............. *G02B 7/028* (2013.01); *G02B 3/14* (2013.01); *G02F 1/29* (2013.01); *G02F 1/294* (2021.01)

(58) Field of Classification Search
CPC .......... G02B 7/028; G02B 3/14; G02B 27/64; G02B 27/646; G02B 7/02; G02F 1/29; G02F 1/294; G03B 17/02
See application file for complete search history.

(56) References Cited

U.S. PATENT DOCUMENTS 4,168,482 A    9/1979  Sternberg
7,602,557 B2  10/2009  Berge et al.
(Continued)

FOREIGN PATENT DOCUMENTS

CN    1669305 A    9/2005
CN    1950725 A    4/2007
(Continued)

*Primary Examiner* — Stephone B Allen
*Assistant Examiner* — Gabriel A Sanz
(74) *Attorney, Agent, or Firm* — Birch, Stewart, Kolasch & Birch, LLP

(57) ABSTRACT

A liquid lens of the present invention includes a first plate including a cavity in which a conductive liquid and a nonconductive liquid are disposed; a first electrode disposed on the first plate; a second electrode disposed under the first plate; a second plate disposed on the first electrode; and a third plate disposed under the second electrode, wherein the second plate includes a first region having a first thickness, the first region encompassing an optical axis, and a second region extended from the first region and having a second thickness greater than the first thickness, and the location of the upper surface of the first region is lower than the location of the upper surface of the second region.

19 Claims, 3 Drawing Sheets

(56) References Cited

U.S. PATENT DOCUMENTS

| | | |
|---|---|---|
| 8,755,124 B2 | 6/2014 | Aschwanden et al. |
| 2007/0247724 A1 | 10/2007 | Jung |
| 2008/0079897 A1 | 4/2008 | Goldfain et al. |
| 2009/0147372 A1* | 6/2009 | Chang ................ G02B 13/0075 |
| | | 359/665 |
| 2010/0277923 A1 | 11/2010 | Takai et al. |
| 2012/0026596 A1* | 2/2012 | Berge ................... G02B 26/005 |
| | | 359/665 |
| 2012/0105971 A1 | 5/2012 | Lee et al. |
| 2012/0113525 A1* | 5/2012 | Kong ....................... G02B 3/14 |
| | | 359/665 |
| 2013/0176628 A1* | 7/2013 | Batchko ............... G02B 26/005 |
| | | 359/665 |
| 2014/0347741 A1* | 11/2014 | Karam ................. G02B 3/0056 |
| | | 359/665 |
| 2020/0003934 A1* | 1/2020 | Karam .................... G02B 3/14 |

FOREIGN PATENT DOCUMENTS

| | | |
|---|---|---|
| CN | 101027577 A | 8/2007 |
| CN | 101331412 A | 12/2008 |
| CN | 201281769 Y | 7/2009 |
| CN | 101661121 A | 3/2010 |
| CN | 102947730 A | 2/2013 |
| JP | 2007-293349 A | 11/2007 |
| KR | 10-2009-0084424 A | 8/2009 |
| KR | 10-0960642 B1 | 6/2010 |
| KR | 10-2010-0109730 A | 10/2010 |
| KR | 10-2012-0045517 A | 5/2012 |
| WO | WO 2004/010679 A2 | 1/2004 |
| WO | WO 2010/073127 A2 | 7/2010 |
| WO | WO 2010/114254 A2 | 10/2010 |

\* cited by examiner

[FIG. 1]
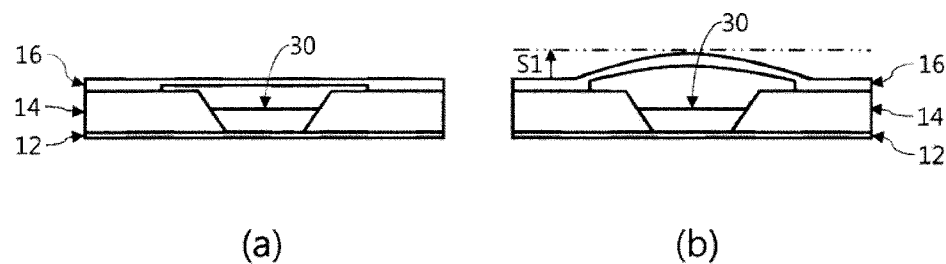
(a)　　　　　　　　　　　(b)
[FIG. 2]
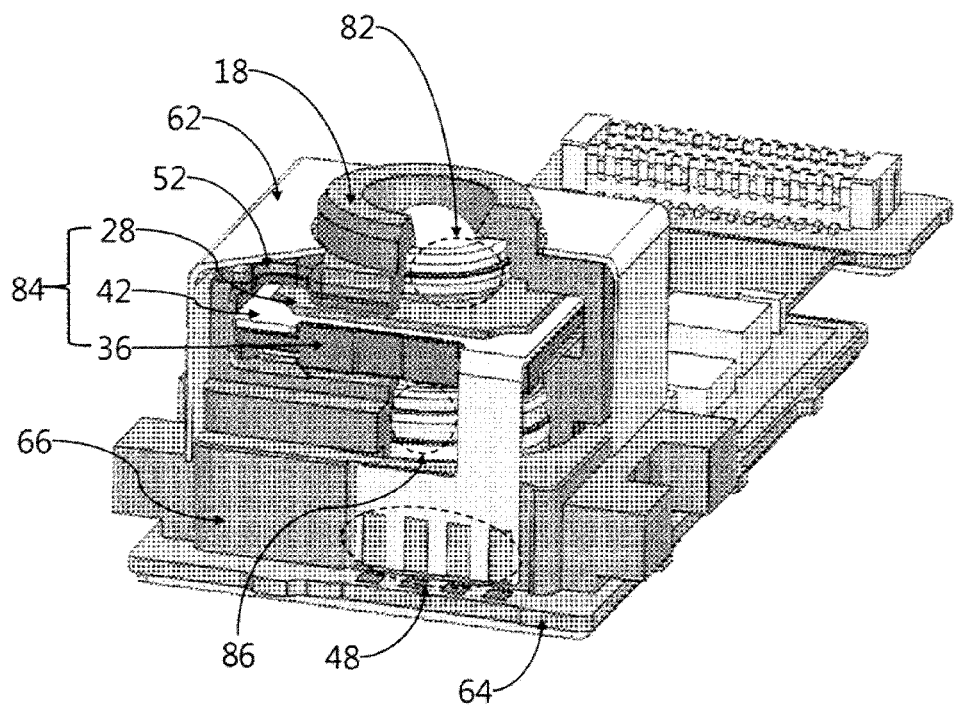

[FIG. 3]
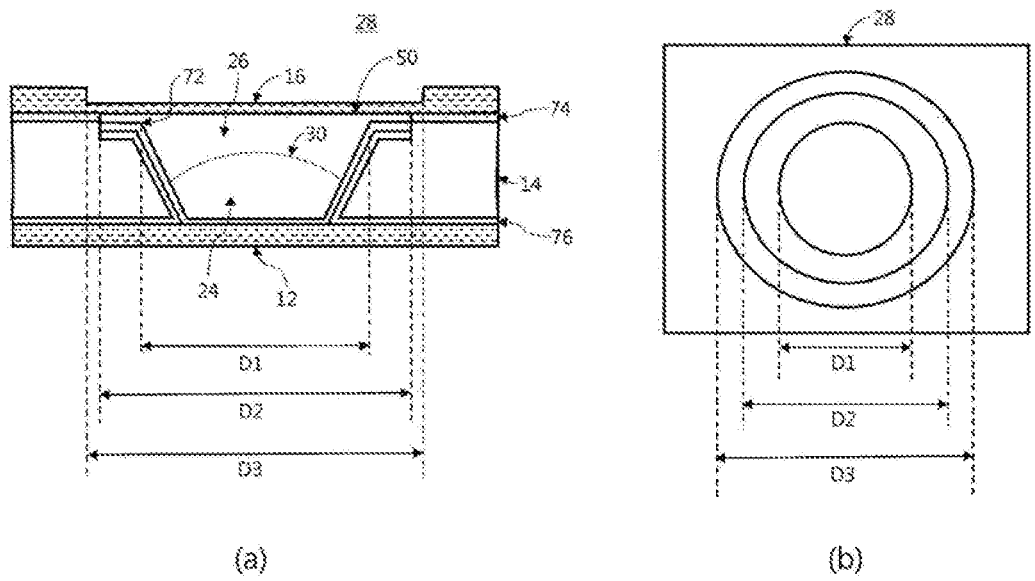
(a)　　　　　　　　　　　　　　(b)
[FIG. 4]
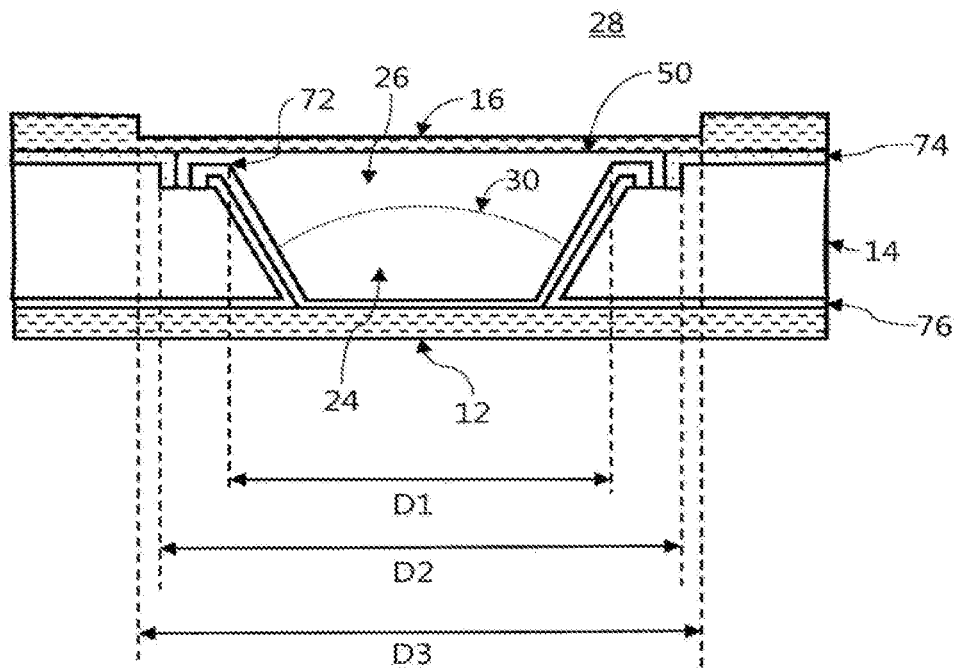

【FIG. 5】
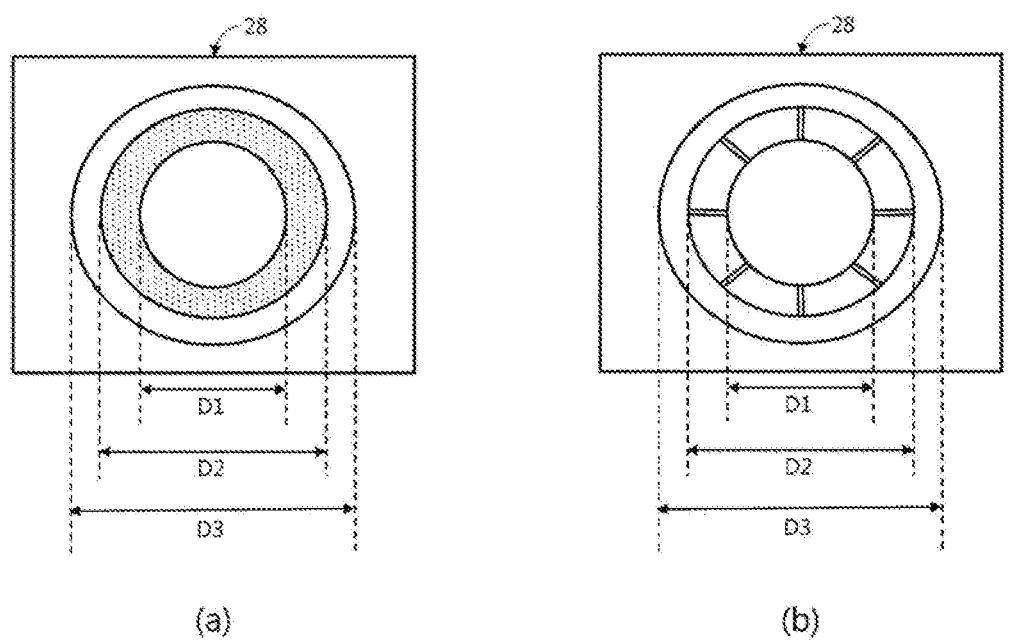
【FIG. 6】
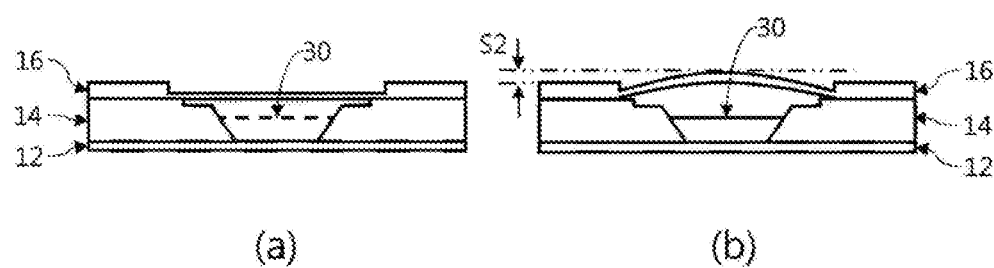

LIQUID LENS, CAMERA MODULE AND OPTICAL DEVICE INCLUDING THE SAME

CROSS-REFERENCE TO RELATED APPLICATIONS

This application is the National Phase of PCT International Application No. PCT/KR2018/001928, filed on Feb. 14, 2018, which claims priority under 35 U.S.C. 119(a) to Patent Application No. 10-2017-0019835, filed in the Republic of Korea on Feb. 14, 2017, all of which are hereby expressly incorporated by reference into the present application.

TECHNICAL FIELD

The present disclosure relates to a liquid lens, a camera module and an optical device including the same. More particularly, the present disclosure relates to a liquid lens capable of reducing interference attributable to deformation of a structure containing a liquid, which occurs due to thermal expansion of the liquid included in the liquid lens in response to a change in the temperature of a lens assembly including the liquid lens and a solid lens.

BACKGROUND ART

People who use portable devices demand optical devices that have high resolution, are small, and have various photographing functions (an autofocus (AF) function, a hand-tremor compensation or optical image stabilization (OIS) function, etc.). Such photographing functions may be realized by directly moving a plurality of lenses that are combined. In the case in which the number of lenses is increased, however, the size of an optical device may be increased. The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens-moving apparatus is used to move the lens module. However, the lens-moving apparatus consumes a lot of power, and an additional cover glass needs to be provided separately from the camera module in order to protect the lens-moving apparatus, thus leading to an increase in the overall thickness of an optical device. Therefore, research has been conducted on a liquid lens configured to electrically adjust the curvature of an interface between two kinds of liquid in order to perform autofocus and hand-tremor compensation functions.

DISCLOSURE

Technical Problem

The present disclosure may provide a camera module including a lens enabling adjustment of a focal length using electrical energy, and a liquid lens, in which, even when a plate having a structure containing a liquid included in the lens is deformed in response to a change in temperature, a lens region of the plate is maintained at a lower position than a peripheral region thereof, thereby reducing interference with other lenses near the liquid lens attributable to swelling of the plate.

In addition, the present disclosure may provide a liquid lens, in which the height of a lens region of an upper plate of the liquid lens is lower than the height of a peripheral region thereof, thus providing a structure in which an upper portion of an intermediate plate, on which an interface is not located, is partially etched in order to secure space for exposing at least one electrode to a conductive liquid.

However, the objects to be accomplished by the disclosure are not limited to the above-mentioned objects, and other objects not mentioned herein will be clearly understood by those skilled in the art from the following description.

Technical Solution

In one embodiment, a liquid lens may include a first plate including a cavity in which a conductive liquid and a non-conductive liquid are disposed, a first electrode disposed on the first plate, a second electrode disposed under the first plate, a second plate disposed on the first electrode, and a third plate disposed under the second electrode, wherein the second plate may include a first region, having a first thickness and encompassing an optical axis, and a second region extending from the first region and having a second thickness that is larger than the first thickness, and the location of the upper surface of the first region may be lower than the location of the upper surface of the second region.

In addition, the entire area of the lower surface of the second plate may be disposed in the same plane.

In addition, the lower surface of the first region and the lower surface of the second region may not be disposed in the same plane.

In addition, the upper portion of the first plate, which faces the second plate, may include a stepped portion.

In addition, the first electrode may be disposed on the lower surface of the second plate.

In addition, the first electrode may be disposed on the upper surface of the first plate.

In addition, the first electrode may extend to a side surface of the stepped portion of the first plate.

In addition, when the first region of the second plate swells upwards, the height of the peak of the first region may be lower than the height of the upper surface of the second region.

In addition, an interface formed between the conductive liquid and the non-conductive liquid may be located on an inclined surface below the stepped portion.

In addition, the stepped portion of the first plate may be etched to a depth equal to the sum of the thickness of the second electrode and the thickness of the insulation layer.

However, the above aspects of the present disclosure are only a part of the exemplary embodiments of the present disclosure, and various embodiments based on the technical features of the present disclosure may be devised and understood by those skilled in the art from the following detailed description of the present disclosure.

Advantageous Effects

The effects of a device according to the disclosure will be described below.

According to the present disclosure, it is possible to reduce interference between a liquid lens and a solid lens even when a plate swells in response to a change in the temperature of the liquid lens, and consequently to improve a design margin and a process margin of a lens assembly including the liquid lens and the solid lens.

In addition, according to the present disclosure, it is possible to improve a design margin and a process margin of a lens assembly including a liquid lens and a solid lens without increasing the size of the lens assembly.

However, the effects achievable through the disclosure are not limited to the above-mentioned effects, and other effects not mentioned herein will be clearly understood by those skilled in the art from the following description.

DESCRIPTION OF DRAWINGS

FIG. 1 illustrates the characteristics of a liquid lens depending on the temperature thereof.

FIG. 2 illustrates a camera module.

FIG. 3 illustrates a first example of the liquid lens.

FIG. 4 illustrates a second example of the liquid lens.

FIG. 5 illustrates an upper portion of a first plate.

FIG. 6 illustrates the characteristics of the liquid lens shown in FIG. 3 or 4 depending on the temperature thereof.

BEST MODE

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

FIG. 1 illustrates the characteristics of a liquid lens depending on the temperature thereof according to the embodiment. Specifically, FIG. 1(a) illustrates the liquid lens at room temperature, and FIG. 1(b) illustrates the liquid lens at a high temperature.

Two liquids having different properties are charged in a cavity, which is defined by a second plate 16, a first plate 14, and a third plate 12, which will be described later. The liquids expand with an increase in temperature (e.g. thermal expansion).

The two liquids charged in the cavity may include an electrolytic (or conductive) liquid and a non-electrolytic (or non-conductive) liquid. The degree of thermal expansion of a liquid may be larger than that of a solid. As the temperature of a material increases, the movement of molecules becomes more active, and the distance between the molecules increases, which may result in an increase in the volume of the material. In particular, since molecules of a liquid move more freely than molecules of a solid, a liquid may thermally expand more than a solid for the same change in temperature. A representative example of an electrolytic (conductive) liquid used in a liquid lens is water ($H_2O$). In the case of water, the volume thereof increases when the temperature rises within the range of 4° C. or higher, but the volume thereof decreases when the temperature rises within the range below 4° C. The coefficient of thermal expansion of water is known to be about 1.8 (unit: $10^{-5}/°$ C.).

Referring to FIG. 1 (a), if there is no change in the volume of the two liquids in the cavity at room temperature, the light incident through the second plate 16 may be refracted at the interface 30 formed by the two liquids in the cavity, and may pass through the third plate 12. Depending on the embodiment, the light may travel along the path in the opposite direction. The curvature of the interface 30 may be controlled by applying electrical energy to the liquid lens.

Referring to FIG. 1 (b), the second plate 16 or the third plate 12 may swell due to a change in the volume of the two liquids in the cavity at a high temperature. For example, the second plate 16 may swell due to a change in the volume of the two liquids in the cavity at a high temperature. Since the center portion and the peripheral region of the second plate 16 may not be bonded to the first plate 14 and the thicknesses of the center portion and the peripheral region may be smaller than the thickness of the bonded region, the second plate 16 may bend in response to an increase in the volume of the two liquids due to a change in temperature. For example, the degree S1 to which the second plate 16 swells may be changed depending on the temperature or the characteristics of the second plate 16.

Meanwhile, despite the change in temperature, the third plate 12 may not swell, or may swell less than the second plate 16. After the first plate 14, on which a plurality of electrode patterns is disposed, is secured on the third plate 12, an insulation layer (not shown) may be formed so as to prevent the electrode patterns from being exposed to the cavity. For example, one of two electrode patterns may be covered with the insulation layer, and a portion of the other one may be exposed, thereby preventing the properties of the two liquids in the cavity from being changed. Due to the insulation layer formed on the first plate 14 and the third plate 12, even when the two liquids thermally expand in response to a change in temperature, the third plate 12 may not swell, but the second plate 16, which has relatively low rigidity, may swell.

When the second plate 16 swells to a particular degree S1, the light incident through the second plate 16 may be refracted by the curvature generated in the second plate 16, separately from the interface 30, the curvature of which is controlled using electrical energy. In this case, the curvature that is generated in the second plate 16 may not be considered when designing the liquid lens. Even when the coefficients of thermal expansion of the two liquids according to a change in temperature are accurately known, uniform curvature of the second plate 16 may not be generated.

Meanwhile, when the second plate 16 swells to a particular degree S1 in response to a change in temperature, the liquid lens may interfere with a structure (e.g. a solid lens, etc.) that is disposed adjacent thereto. If the interval between the liquid lens and a structure disposed adjacent thereto is secured in order to avoid interference therebetween attributable to the swelling of the second plate 16, this may increase the size and the volume of a module or a device including the liquid lens. Further, in this case, it may be difficult to ensure a design margin and a process margin in the process of manufacturing a module or a device including the liquid lens.

FIG. 2 illustrates a camera module.

As illustrated, a camera module may include a liquid lens module 84 and a sensor board 64 on which an image sensor is mounted. The camera module may include a holder 18, which includes an upper open portion and a lower open portion, a liquid lens module 84 accommodated in the holder 18, a first lens unit 82 disposed on the liquid lens module 84, a second lens unit 86 disposed under the liquid lens module 84, and a sensor board 64 disposed under the second lens unit 86 and having an image sensor mounted thereon. At least one of the first lens unit 82 or the second lens unit 86 may be omitted.

The liquid lens module 84 may include a plurality of lenses. The lenses may include a liquid lens 28, which includes an interface formed by two liquids, and a solid lens. The liquid lens module 84 may include the liquid lens 28, which includes an interface formed by the two liquids, a spacer 36 surrounding the liquid lens 28, and at least one board 42 supplying a driving voltage to the liquid lens 28. The board 42 may electrically connect the sensor board 64 to the liquid lens 28. The board 42 may supply a plurality of mutually distinguishable driving voltages, and the respective driving voltages may be transmitted through a plurality of terminals 48.

Meanwhile, the holder 18 included in the camera module may include a plurality of openings 52 formed therein. The position and the arrangement of the liquid lens module may be adjusted using the liquid lens 28, which is exposed through the openings 52 after the liquid lens module is inserted into the holder 18. In this manner, the liquid lens module 84 may be mechanically aligned with the first lens unit 82 and the second lens unit 86.

FIG. 3 illustrates a first example of the liquid lens. Specifically, FIG. 3(*a*) is a cross-sectional view of the liquid lens 28, and FIG. 3(*b*) is a top view of the liquid lens 28.

The liquid lens 28 may include liquids, a first plate, and electrodes. The liquids may include a conductive liquid and a non-conductive liquid, which form an interface therebetween. The first plate may include a cavity in which the liquids are disposed. The side wall of the cavity may include an inclined surface. The electrodes may be disposed on and/or under the first plate. The electrodes may include a first electrode (an upper electrode) disposed on the first plate or a second electrode (a lower electrode) disposed under the first plate. The liquid lens may further include a second plate disposed on the first plate or a third plate disposed under the first plate. The second plate may be disposed on the first electrode (the upper electrode), and the third plate may be disposed under the second electrode (the lower electrode).

Referring to FIG. 3(*a*), the liquid lens 28 may include two different liquids, e.g. a conductive liquid and a non-conductive liquid, and the curvature and the shape of an interface 30 formed by the two liquids may be adjusted using a driving voltage supplied to the liquid lens 28. The driving voltage supplied to the liquid lens 28 may be transmitted through the first electrode 74 and the second electrode 76. The second electrode 76 may include a plurality of voltage sectors in order to transmit multiple (e.g. four) individual driving voltages, which are distinguishable from each other, and the first electrode 74 may transmit one common voltage. The common voltage may be a reference voltage.

In addition, the liquid lens 28 may include a third plate 12 and a second plate 16, which include a transparent material, and may further include a first plate 14, which is disposed between the third plate 12 and the second plate 16 and includes an open region having a predetermined inclined surface.

In addition, the liquid lens 28 may include a cavity 50, which is defined by the third plate 12, the second plate 16, and the open region in the first plate 14. Here, the cavity 50 may be filled with two liquids 26 and 24 having different properties (e.g. a conductive liquid and a non-conductive liquid), and an interface 30 may be formed between the two liquids 26 and 24 having different properties.

The lens region of the second plate 16, which includes the center portion thereof, may be thinner than the peripheral region thereof, which is connected to the first plate 14. One side of the second plate 16, which is oriented toward the cavity 50, may be formed such that the peripheral region and the lens region are flat, but the opposite side of the second plate 16 may be formed such that the lens region is concavely recessed with respect to the peripheral region. That is, the surface of the second plate 16 that faces the cavity 50 (the lower surface of the second plate) may be formed such that the lens region and the peripheral region of the second plate are flat. Since the lens region on the opposite side of the second plate 16 is concavely recessed, even when the second plate 16 swells due to thermal expansion of the liquids in the cavity 50, interference with a structure disposed adjacent thereto may be reduced. That is, the surface of the second plate 16 (the upper surface of the second plate), which is opposite the surface of the second plate 16 (the lower surface of the second plate) that faces the cavity 50, may include an avoidance recess formed as a result of concavely forming the lens region. The thickness in the optical-axis direction of the lens region on the surface of the second plate 16 (the upper surface of the second plate), which is opposite the surface of the second plate 16 (the lower surface of the second plate) that faces the cavity 50, may be smaller than the thickness in the optical-axis direction of the peripheral region of the second plate that is coupled to the first plate.

Depending on the embodiment, the entire lower surface of the second plate 16 may be disposed in the same plane. Alternatively, the lower surface of the center region of the second plate 16 and the lower surface of the peripheral region thereof may not be disposed in the same plane.

Further, at least one of the two liquids 26 and 24 included in the liquid lens 28 may be conductive, and the liquid lens 28 may further include two electrodes 74 and 76, which are disposed on and under the first plate 14, respectively, and an insulation layer (or, insulation film) 72, which is disposed on the inclined surface that is liable to contact the conductive liquid. Here, the insulation layer 72 may cover one (e.g. the second electrode 76) of the two electrodes 74 and 76, and may expose a portion of the other one (e.g. the first electrode 74) of the two electrodes 74 and 76 so that electrical energy is applied to the conductive liquid (e.g. 26).

Meanwhile, when the side of the second plate 16 that faces the cavity 50 is flat, it may be difficult to expose the first electrode 74 to the conductive liquid 26. In order to overcome this structural problem, the upper portion of the first plate 14 may be at least partially etched in order to expose the first electrode 74 to the conductive liquid 26. The second electrode 76 may be formed in the etched region of the upper portion of the first plate 14, and the insulation layer 72 may be disposed on the second electrode 76. At this time, the upper portion of the first plate 14 may be removed to a depth equal to the sum of the thickness of the second electrode 76 and the thickness of the insulation layer 72. That is, the upper portion of the first plate 14 may include a stepped portion.

Depending on the embodiment, the upper portion of the first plate 14 may be etched to a depth greater than the sum of the thickness of the second electrode 76 and the thickness of the insulation layer 72; however, this does not need to interrupt the movement of the interface 30 along the inclined surface of the first plate 14. Therefore, the upper portion of the first plate 14 may be etched to a depth equal to about 10 to 15% of the length of the inclined surface. Accordingly, the interface 30 formed between the conductive liquid and the non-conductive liquid may be located on the inclined surface below the stepped portion formed through the etching.

Depending on the embodiment, the first electrode 74 may be formed on the first plate 14 and on the insulation layer 72. In this case, the first electrode 74 may be easily exposed to the conductive liquid 26.

Two boards 42 (refer to FIG. 2) for transmitting driving voltages to the two electrodes 74 and 76 included in the liquid lens 28 may be connected to the liquid lens. The curvature and the inclination of the interface 30 formed in the liquid lens 28 may be changed in response to the driving voltages, with the result that the focal length of the liquid lens 28 may be adjusted.

Referring to FIG. 3(b), the structure of the liquid lens 28 may be understood by comparing the diameter D1 of the opening region defined by the first plate 14, the diameter D2 defined by the stepped region of the first plate, and the diameter D3 of the center region of the second plate 16. The diameter D2 of the upper portion of the first plate 14 that is etched may be larger than the diameter D1 of the open region defined by the first plate 14. Further, the diameter D3 of the center region of the second plate 16 may be larger than the diameter D2 of the upper portion of the first plate 14, which has a small thickness.

Meanwhile, when viewed in plan, the lens region of the second plate 16 may encompass the upper portion of the first plate 14, which has a small thickness.

FIG. 4 illustrates a second example of the liquid lens.

As illustrated, the liquid lens differs from the liquid lens shown in FIG. 3 in terms of the shape of the first electrode 74 disposed on the first plate 14. Compared with the liquid lens shown in FIG. 3, the first electrode 74 may be formed so as to expand to the upper portion of the first plate 14, which has a small thickness. As a result, the degree to which the second electrode 76 extends to the upper portion of the first plate 14 may be reduced, the second electrode 76 may be covered with the insulation layer 72, and the first electrode 74 may be exposed to the conductive liquid 26.

Since the first electrode 74 is formed in an expanded configuration, even when a portion of the first electrode 74, which serves as an adhesive in the process of bonding the first plate 14 and the second plate 16, is lost in the bonding process, it is possible to easily expose the first electrode 74 to the conductive liquid 26.

FIG. 5 illustrates the upper portion of the first plate. Specifically, FIGS. 5(a) and 5(b) illustrate respectively different structures of the upper portion of the first plate 14.

Referring to FIGS. 3, 4, 5(a) and 5(b), respectively different structures of the first plate 14 for exposing the first electrode 74 to the conductive liquid 26 will be described. Specifically, as shown in FIG. 5(a), the upper portion of the first plate 14 may be uniformly etched to a particular depth. Depending on the embodiment, as shown in FIG. 5(b), a pattern that includes a plurality of recesses formed to a predetermined depth may be formed at the upper portion of the first plate 14. For example, the shape in which the upper portion of the first plate 14 is etched to a predetermined depth may vary depending on the method of exposing the first electrode 74 to the conductive liquid 26.

However, the method of exposing the first electrode 74 to the conductive liquid 26 may have an adverse influence on the lens region of the liquid lens 28, i.e. the region through which light passes, which is undesirable. Therefore, the diameter D2 of the region of the upper portion of the first plate 14 that is etched to expose the first electrode needs to be larger than the diameter D1 of the open region determined by the first plate 14. In addition, the diameter D3 of the center region of the second plate 16 may be larger than the diameter D1 of the open region defined by the first plate 14.

Depending on the embodiment, the diameter D3 of the center region of the second plate 16 may be larger than the diameter D2 of the region of the upper portion of the first plate 14 that is etched to expose the first electrode, or vice versa.

FIG. 6 illustrates the characteristics of the liquid lens shown in FIG. 3 or 4 depending on the temperature thereof. Specifically, FIG. 6(a) illustrates the liquid lens at room temperature, and FIG. 6(b) illustrates the liquid lens at a high temperature. Two liquids having different properties are charged in the cavity, which is defined by the second plate 16, the first plate 14, and the third plate 12. The two liquids may expand with an increase in temperature (e.g. thermal expansion).

Referring to FIG. 6(a), if there is no change in the volume of the two liquids in the cavity at room temperature, the light incident through the second plate 16 may be refracted at the interface 30 formed by the two liquids in the cavity, and may pass through the third plate 12. Depending on the embodiment, the light may travel along the path in the opposite direction. The curvature of the interface 30 may be changed by applying electrical energy to the liquid lens, thereby controlling the liquid lens in a desired direction.

Referring to FIG. 6(b), the second plate 16 may swell due to a change in the volume of the two liquids in the cavity at a high temperature. Since the center region of the second plate 16 is not bonded to the first plate 14 and the thicknesses of the center region is smaller than the thickness of the peripheral region bonded to the first plate 14, the second plate 16 may bend in response to an increase in the volume of the two liquids due to a change in temperature. However, the degree S2 to which the second plate 16 swells may be smaller than the degree S1 to which the second plate 16 shown in FIG. 1(b) swells. This is because the lens region may be formed such that the upper surface of the second plate 16 (i.e. the surface oriented in the direction opposite the cavity) is concavely recessed. In addition, when the center region of the second plate 16 swells upwards, the height of the peak of the center region may be lower than the height of the upper surface of the peripheral region.

As such, when the degree S2 to which the second plate 16 swells in response to a change in temperature is greatly reduced, the liquid lens may interfere less with a structure (e.g. a solid lens, etc.) that is disposed adjacent thereto. When the degree S2 to which the second plate 16 swells in response to a change in temperature is greatly reduced, the interval between the liquid lens and a structure adjacent thereto, which needs to be secured in order to avoid interference, may also be reduced. It is possible to easily ensure a design margin and a process margin in the process of manufacturing a module or a device including the liquid lens.

Although only a limited number of embodiments have been described above, various other embodiments are possible. The technical contents of the above-described embodiments may be combined into various forms as long as they are not incompatible with one another, and thus may be implemented in new embodiments.

For example, an optical device (or an optical instrument) including the above-described camera module may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an autocollimator, and a lens-meter, and the embodiments may be applied to optical devices that may include the liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

The invention claimed is:

1. A liquid lens, comprising:
    a first plate comprising a cavity in which a conductive liquid and a non-conductive liquid are disposed;
    a first electrode disposed on the first plate;
    a second electrode disposed under the first plate;
    a second plate disposed on the first electrode; and
    a third plate disposed under the second electrode,
    wherein the second plate comprises:
        a first region having a first thickness, the first region encompassing an optical axis; and
        a second region extending from the first region, the second region having a second thickness that is larger than the first thickness,
    wherein a location of an upper surface of the first region is lower than a location of an upper surface of the second region,
    wherein an upper portion of the first plate that faces the second plate comprises a stepped portion,
    wherein the stepped portion comprises:
        a first surface extending from an inclined surface of the cavity; and
        a second surface disposed closer to a lower surface of the second plate than the first surface, and
    wherein the first electrode and the second electrode are disposed on the first surface while being spaced apart from each other.

2. The liquid lens according to claim 1, wherein an entire area of the lower surface of the second plate is disposed in a same plane.

3. The liquid lens according to claim 1, wherein a lower surface of the first region and a lower surface of the second region are not disposed in a same plane.

4. The liquid lens according to claim 1, wherein the first electrode is disposed on the lower surface of the second plate.

5. The liquid lens according to claim 1, wherein the first electrode is disposed to be exposed to the conductive liquid at the stepped portion of the first plate.

6. The liquid lens according to claim 5, wherein the first electrode extends to a side surface of the stepped portion of the first plate to be exposed to the conductive liquid, the side surface being disposed between the first surface and the second surface.

7. The liquid lens according to claim 1, wherein, when the first region of the second plate swells upwards, a height of a peak of the first region is lower than a height of the upper surface of the second region.

8. The liquid lens according to claim 1, wherein an interface formed between the conductive liquid and the non-conductive liquid is located on the inclined surface below the stepped portion.

9. The liquid lens according to claim 1, wherein an upper surface of the second plate is concavely recessed to form an avoidance recess, and
    wherein the avoidance recess is positioned at the first region.

10. The liquid lens according to claim 1, wherein the second electrode is disposed to extend from a lower portion of the first plate to the stepped portion of the first plate along the inclined surface of the cavity.

11. The liquid lens according to claim 10, further comprising an insulation layer covering the second electrode not to be exposed to the conductive liquid and the non-conductive liquid.

12. The liquid lens according to claim 11, wherein the stepped portion of the first plate is etched to a depth equal to a sum of a thickness of the second electrode and a thickness of the insulation layer.

13. The liquid lens according to claim 12, wherein the second plate is coupled to the first plate at the second region.

14. The liquid lens according to claim 13, wherein the first plate includes an open region defining the cavity, and
    wherein a diameter of an upper portion of the first plate that is etched is greater than a diameter of the open region.

15. The liquid lens according to claim 14, wherein a diameter of the first region is greater than the diameter of the upper portion of the first plate that is etched.

16. The liquid lens according to claim 14, wherein the diameter of the upper portion of the first plate that is etched is greater than a diameter of the first region.

17. The liquid lens according to claim 14, wherein a diameter of the first region is greater than the diameter of the open region.

18. A camera module, comprising:
    a liquid lens module including the liquid lens according to claim 1;
    a holder accommodating the liquid lens module; and
    a sensor board disposed under the holder, an image sensor being mounted on the sensor board.

19. An optical device comprising the camera module according to claim 18.

* * * * *